United States Patent
Leighton (10) Patent No.: US 12,259,586 B2
(45) Date of Patent: Mar. 25, 2025

(54) OPTICAL DEVICE

(71) Applicant: Snap Inc., Santa Monica, CA (US)

(72) Inventor: James Leighton, Burghfield Common (GB)

(73) Assignee: SNAP INC., Santa Monica, CA (US)

( * ) Notice: Subject to any disclaimer, the term of this patent is extended or adjusted under 35 U.S.C. 154(b) by 186 days.

(21) Appl. No.: 17/995,552

(22) PCT Filed: Apr. 7, 2021

(86) PCT No.: PCT/EP2021/059090
§ 371 (c)(1),
(2) Date: Oct. 5, 2022

(87) PCT Pub. No.: WO2021/204891
PCT Pub. Date: Oct. 14, 2021

(65) Prior Publication Data
US 2023/0152536 A1    May 18, 2023

(30) Foreign Application Priority Data
Apr. 7, 2020  (EP) .................................... 20168514

(51) Int. Cl.
G02B 6/42        (2006.01)
G02B 27/01       (2006.01)

(52) U.S. Cl.
CPC ......... *G02B 6/4206* (2013.01); *G02B 6/4214* (2013.01); *G02B 27/0172* (2013.01); *G02B 27/017* (2013.01)

(58) Field of Classification Search
CPC ..... G02B 6/0076; G02B 6/4206; G02B 6/423
See application file for complete search history.

(56) References Cited

U.S. PATENT DOCUMENTS 7,609,932 B1    10/2009  Spillane
2006/0007386 A1  1/2006  Cavanaugh et al.
(Continued)

FOREIGN PATENT DOCUMENTS

| CN | 115443426 A | 12/2022 |
|---|---|---|
| EP | 4133316 A1 | 2/2023 |
| WO | WO-2021204891 A1 | 10/2021 |

OTHER PUBLICATIONS

"International Application Serial No. PCT/EP2021/059090, International Search Report mailed Jun. 23, 2021", 4 pgs.
(Continued)

*Primary Examiner* — Chad H Smith
(74) *Attorney, Agent, or Firm* — SCHWEGMAN LUNDBERG & WOESSNER, P.A.

(57) ABSTRACT

Optical devices and methods include a first waveguide having a first surface and a second waveguide including a second surface. The first waveguide is at a fixed position relative to the second waveguide with the first surface at least partly facing the second surface, and the first surface includes a first positioning element. The first positioning element is a NanoImprint Lithography (NIL) structure. The optical device further includes an adhesive arranged for attaching the first surface to the second surface, where the first positioning element is arranged to control a position of the adhesive. The first positioning element includes a philic region adapted to attract the adhesive, or a phobic region adapted to repel the adhesive.

20 Claims, 6 Drawing Sheets

(56) References Cited

U.S. PATENT DOCUMENTS

| | | | |
|---|---|---|---|
| 2008/0136955 A1* | 6/2008 | Kathman | G02B 6/4232 |
| | | | 257/E31.127 |
| 2011/0242146 A1 | 10/2011 | Uchida et al. | |
| 2015/0219918 A1* | 8/2015 | Kim | G02B 5/30 |
| | | | 250/453.11 |
| 2016/0252724 A1 | 9/2016 | Nikkhoo | |
| 2019/0235580 A1* | 8/2019 | Park | H04B 1/3888 |
| 2021/0109278 A1* | 4/2021 | Peroz | G02B 6/0016 |

OTHER PUBLICATIONS

"International Application Serial No. PCT/EP2021/059090, Written Opinion mailed Jun. 23, 2021", 7 pgs.

"European Application Serial No. 21717422.6, Communication pursuant to Rules 161(1) and 162 EPC", 3 pgs.

"European Application Serial No. 21717422.6, Response to Communication pursuant to Rules 161(1) and 162 EPC filed May 15, 2023", 40 pgs.

"European Patent Application Serial No. 21717422.6, Office Action Response Filed May 15, 2023", 40 pgs.

"International Application Serial No. PCT/EP2021/059090, International Preliminary Report on Patentability mailed Oct. 20, 2022", 9 pgs.

Fernández Estévez, Ariadna, "Functional surfaces by means of Nanoimprint Lithography Techniques", (2016), 215 pgs.

* cited by examiner

OPTICAL DEVICE

CLAIM OF PRIORITY

This application is a U.S. national-phase application filed under 35 U.S.C. § 371 from International Application Serial No. PCT/EP2021/059090, filed on Apr. 7, 2021, and published as WO 2021/204891 on Oct. 14, 2021, which claims the benefit of priority to EP application Ser. No. 20168514.6, filed on Apr. 7, 2020, each of which are incorporated herein by reference in their entireties.

TECHNICAL FIELD

The present disclosure relates to optical devices comprising waveguides. For example, such an optical device may be used in a near-eye display.

BACKGROUND

Optical devices comprising a plurality of stacked waveguides are required in a variety of scenarios. For example, each of a plurality of stacked waveguides may be optimized to guide light with a respective different frequency, such that the optical device is overall able to guide light of a wide range of frequencies.

For example, in a virtual reality headset an optical device comprising one or more waveguides is provided in front of a user's eye or eyes. A light projector transmits light towards the waveguides. Light can be coupled into each waveguide by an input diffraction grating. Light then propagates within each waveguide by total internal reflection and an output diffraction grating couples light out of each waveguide and towards a viewer.

Additionally, a viewer may be able to see light from their external environment, transmitted through the waveguides, as well as projected light from the projector. This can provide an augmented reality experience.

One challenge in the field of virtual or augmented reality is to provide a full colour display with projected light. Aberrations and effects introduced by the optics mean that this can be difficult to achieve in practice. By stacking a plurality of waveguides optimized for different frequencies, each waveguide can provide a colour component of the full colour display, while minimizing any aberrations or unwanted optical effects.

Applications of optical devices having stacked waveguides require precise positioning of the waveguides in the stack. For example, waveguides are preferably kept as close together as possible, in order to reduce an apparent volume of the optical device. However, the distance between waveguides must be kept large enough to eliminate evanescent wave coupling and to minimise crosstalk or energy loss. Similarly a lateral positioning of the waveguides must be precisely controlled, for example to align optically functional areas of different waveguides.

Stacked waveguides are generally attached to each other using an adhesive such as a glue. However, such adhesives have a problem in that they are capable of flowing. With a flowing adhesive, it is difficult to precisely control either a distance between the waveguides or a lateral positioning of the waveguides, because either or both of these properties may change as the adhesive solidifies.

Accordingly, it is desirable to provide an optical device comprising a plurality of waveguides, in which the relative positioning of the waveguides is precisely controlled.

Additionally, each waveguide has at least one optically functional area on a surface. For example, this may be an area where light enters or leaves the waveguide. A flowing adhesive may partly flow along the surface into the optically functional area, and either prevent the waveguide from functioning, or reduce the effectiveness of the waveguide.

Accordingly, it is desirable to provide an optical device comprising a plurality of waveguides, in which a position of an adhesive between waveguides is precisely controlled.

SUMMARY

According to a first aspect of the present disclosure, there is provided an optical device comprising: a first waveguide comprising a first surface; and a second waveguide comprising a second surface, wherein the first waveguide is at a fixed position relative to the second waveguide with the first surface at least partly facing the second surface, and the first surface comprises a first positioning element, wherein the first positioning element is a NanoImprint Lithography, NIL, structure.

Providing a NIL positioning element has the effect of more conveniently and/or more accurately defining the relative position of the first and second waveguides.

Optionally, the first positioning element is arranged to control a position of the second surface relative to the first surface.

By using the NIL positioning element specifically to control the relative position of the two surfaces, the positioning element can be used as a precise physical constraint on the relative position of the two surfaces.

Optionally, the first positioning element is arranged to control a spacing between the first surface and the second surface.

Using a NIL positioning element to control the spacing between two waveguides means that it is no longer necessary to use more complex positioning techniques based on optical feedback such as an image through the waveguide or the tracking of fiducials. Instead, the two surfaces can be simply physically placed in contact, and the NIL positioning element can correctly control the required spacing between the waveguides.

Optionally, the second surface comprises a second positioning element that is a NanoImprint Lithography, NIL, structure.

Providing a second positioning element on a surface opposing the first surface reinforces the advantages of the first positioning element on the first surface. Additionally, by spreading positioning functionality across two surfaces, a density of NIL modifications on each surface can be reduced.

Optionally, the second positioning element is adapted to engage with the first positioning element.

Providing positioning elements on opposing surfaces of waveguides and adapting the positioning elements to engage with each other means that it is not necessary for a positioning element on one surface to contact the opposing surface.

Accordingly, this reduces the chance of damage to a surface of the waveguide during assembly of the optical device.

Optionally, the optical device further comprises an adhesive arranged for attaching the first surface to the second surface.

Attaching the waveguides together ensures that a precise relative positioning is maintained.

Optionally, the first positioning element is arranged to control a position of the adhesive.

Providing a positioning element for controlling a position of an adhesive enables precise control of where the adhesive is located, ensuring that the adhesive is adequately provided in areas where are intended to be used for adhering the two surfaces, and that the adhesive is not present in areas which are not intended for adhering the two surfaces.

Optionally, the first positioning element comprises: a philic region adapted to attract the adhesive; or a phobic region adapted to repel the adhesive.

Modifying the attractiveness or repulsiveness of the first surface means that the positioning element can control a position of the adhesive without using a solid protrusion to block and/or contain the adhesive. This, for example, controls the position of the adhesive without reducing a volume of adhesive which can be contained between two waveguides, and enables removal of the adhesive without damaging the positioning element.

Optionally, the first surface or the second surface comprises an optically functional region, the first positioning element comprises a barrier portion arranged to surround the optically functional region, and the adhesive is arranged on the first surface outside of the barrier portion.

This arrangement of a barrier portion has the advantage of preventing the adhesive from flowing into the optically functional region, and thus increases the chance of an optical device functioning correctly after being assembled.

Optionally, the adhesive is opaque.

Using an opaque adhesive allows the adhesive to simultaneously reduce interference from light sources which are not intended as an input to the waveguides.

Optionally, the adhesive is adapted to control a spacing between the first surface and the second surface.

Using an adhesive which is adapted to control the spacing between waveguides means that a positioning element can simultaneously and synergistically prevent the adhesive from spreading to an area where it is not supposed to be, and improve the precision of spacing between the waveguides.

Optionally, the adhesive comprises microspheres or beads.

Microspheres and beads provide a solid or resilient component to the adhesive which sets a minimum thickness for the adhesive. By controlling the size of the microspheres or beads, the spacing between waveguides can also be controlled.

According to a second aspect of the present disclosure, there is provided a method for manufacturing an optical device comprising a first waveguide and a second waveguide wherein the first waveguide is at a fixed position relative to the second waveguide, the method comprising: performing NanoImprint Lithography on a first surface of the first waveguide to produce a positioning element on the first surface; arranging the first waveguide at a fixed position relative to the second waveguide with the first surface at least partly facing the second surface, using the positioning element.

Performing nanoimprint lithography to produce a NIL positioning element has the effect of more conveniently and/or more accurately defining the relative position of the first and second waveguides.

DETAILED DESCRIPTION

Figure 1:
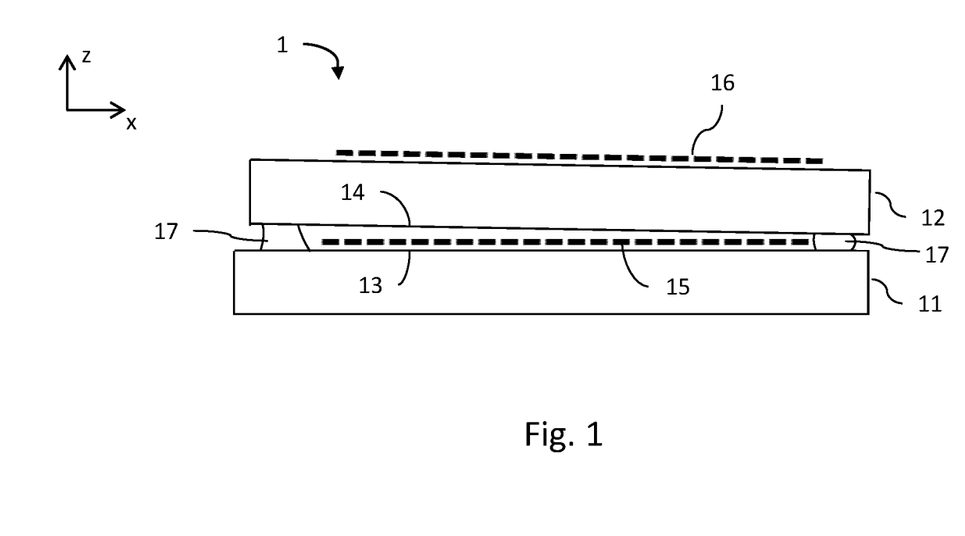
FIG. 1 is a schematic illustration of an optical device manufactured according to known techniques.

FIG. 1 schematically illustrates a cross-section of an optical device 1 comprising a first waveguide 11 and a second waveguide 12. A first surface 13 of the first waveguide 11 is arranged to face a second surface 14 of the second waveguide 12.

With such an arrangement, a first optically functional region 15 of the first waveguide 11 and a second optically functional region 16 of the second waveguide 12 may be arranged on a common optical axis. For example, the first optically functional region 15 and the second optically functional region 16 may be output gratings arranged to diffract light onto the common optical axis, to provide a combined light output from the optical device. Alternatively, the first and second optically functional regions 15, 16 may be input gratings arranged to diffract different light frequency ranges from incident light into the respective waveguides 11, 12.

The first waveguide 11 and the second waveguide 12 are attached to each other using one or more regions of an adhesive 17 (two regions as shown in FIG. 1). The adhesive 17 has the effect of fixing a relative position of the first waveguide 11 relative to the second waveguide 12.

However, as can be seen by comparing the different regions of adhesive 17 in FIG. 1, this method does not reliably provide a constant spacing between the first and second waveguides 11, 12. In this example, the two waveguides 11, 12 are more closely spaced on the right of the figure than on the left.

Furthermore, in this example, there is nothing to stop the adhesive 17 from flowing into the optically functional area 15 on the first surface 13 during manufacturing, before the adhesive solidifies.

According to the invention, either or both of these problems is/are addressed using nanoimprint lithography (NIL).

Nanoimprint lithography comprises deformation of an imprint resist using a mould, and curing the resist in a final shape. The resist may, for example, be a thermoplastic material subjected to heat during moulding or a UV-cured material subjected to UV light when it is in the mould. When the mould is removed, the resist has the required shape defined by the mould.

As an example, the resist may comprise a polymer such as polypropylene. As another example, the resist may comprise a transparent resin, which may specifically be a high-refractive index transparent resin. The mould may comprise similar materials to the resist. Alternatively, the mould may be fabricated using harder materials. For example, the mould may be fabricated using nickel electroplating.

Nanoimprint lithography may be used to modify an existing surface by first depositing the resist as a film on the surface. For example, the resist may be deposited using spin coating. After deposition, the resist is deformed as described above. Alternatively, the resist can be moulded before being attached to the existing surface.

By this technique, customized surface structures with micro-scale or nano-scale dimensions may be added to a surface.

The theory of nanoimprint lithography techniques is, for example, discussed in the doctoral thesis "Functional surfaces by means of nanoimprint lithography techniques" by Ariadna Fernandez Estevez, Universitat Autonoma de Barcelona, 2016.

Figure 2A:
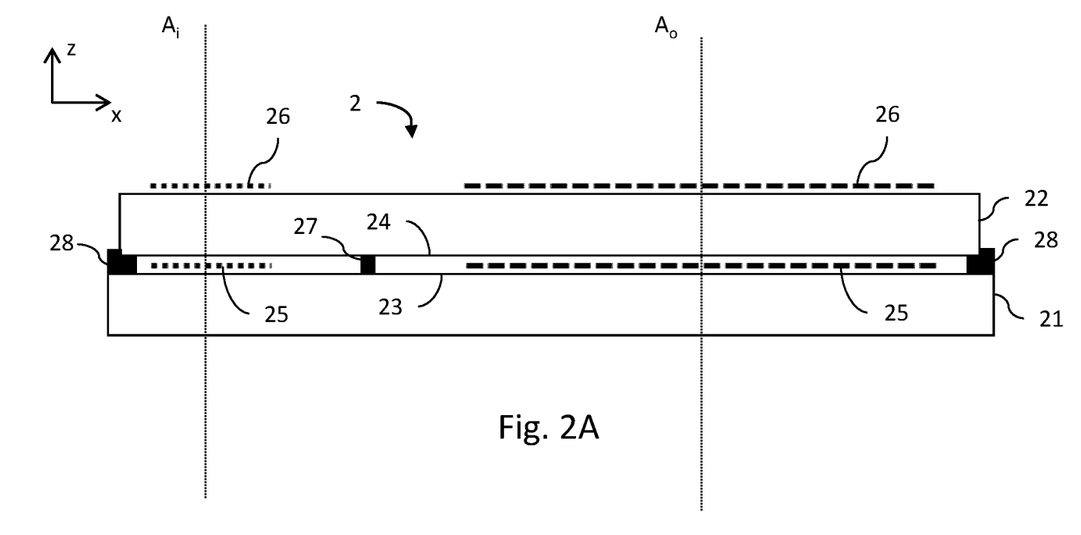
FIG. 2A is a schematic illustration of an optical device according to an embodiment.

FIG. 2A is a schematic cross-section illustration of an optical device according to an embodiment. The optical device of FIG. 2A may be the same as the optical device of FIG. 1, except where otherwise described below.

As in FIG. 1, the optical device 2 comprises a first waveguide 21 and a second waveguide 22, and a first surface 23 of the first waveguide is arranged to face a second surface 24 of the second waveguide.

In this embodiment, the two waveguides 21, 22 have similar shapes, and the first surface 23 is fully aligned to face the second surface 24. However, this is not necessary for embodiments of the invention and, in other embodiments, the first surface 23 may have a different shape from the second surface 24 and/or may only partly face the second surface 24.

In this embodiment, each waveguide 21, 22 has two optically functional regions 25, 26. A first optically functional region on each waveguide is arranged along an input optical axis $A_i$, and a second optically functional region on each waveguide is arranged along an output optical axis $A_o$. For example, the optical device may be arranged to receive incident light in a field of view around the input optical axis $A_i$ and to output light in a field of view around the output optical axis $A_o$. In other embodiments, each waveguide may have one or more optically functional regions in any arrangement.

In this embodiment, the first surface 23 comprises three positioning elements 27, 28, each of which is a NanoImprint Lithography, NIL, structure. Each of the positioning elements 27, 28 is arranged to control a position of the second surface 24 relative to the first surface 23.

A first positioning element 27 is arranged to control a spacing between the first surface 23 and the second surface 24. For example, the first positioning element 27 may be a block or pillar protrusion from the first surface 23.

Second and third positioning elements 28 are arranged to both control a spacing between the first surface 23 and the second surface 24, and to control a relative position of the waveguides in a second direction (the labelled x-direction). In the embodiment shown in FIG. 2 this is achieved by adapting the second and third positioning elements 28 to fit with a corner of the second waveguide 22.

More generally, one or more positioning elements may be arranged to control a position of the second surface relative to the first surface in three dimensions. For example, a plurality of positioning elements comprising different height protrusions from the first surface 23 may be used to define a sloped space between the first surface 23 and the second surface 24.

Additionally, the second surface 24 may also comprise one or more positioning elements that are NanoImprint Lithography, NIL, structures. For example, the first positioning element 27 could protrude from the second surface 24 instead of protruding from the first surface 23.

Figure 2B:
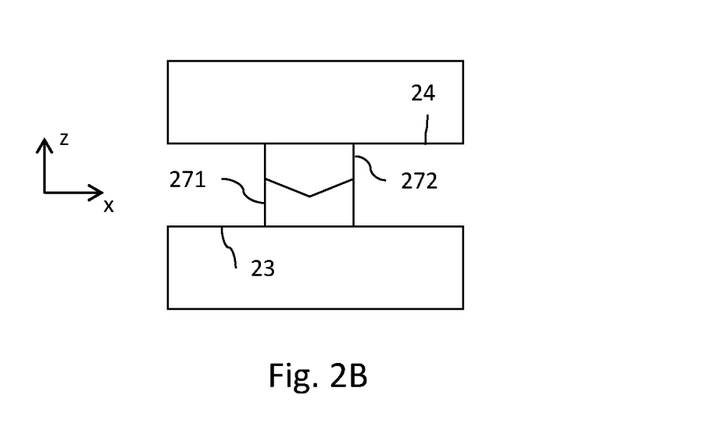
FIG. 2B is a schematic illustration of an optical device wherein a first positioning element is adapted to engage with a second positioning element.

For example, as illustrated in FIG. 2B, a positioning element 272 of the second surface 24 may be adapted to engage with a positioning element 271 of the first surface 23. For example, the two positioning elements each comprising a protrusion may be adapted to engage end to end. This has the advantage that it is not necessary for a positioning element of one surface to contact the other surface, and a risk of damage to a surface of a waveguide while constructing the optical device is reduced.

An adhesive may be arranged for attaching the first surface 23 to the second surface 24. For example, the adhesive may be arranged on one or more of the positioning elements.

The adhesive may simply be placed as in FIG. 1 and allowed to solidify. However, it is advantageous to provide a positioning element on the first or second surface which is adapted to control the position of the adhesive, for example in order to keep the adhesive from flowing into an optically functional region. This positioning element may be provided in addition to or instead of the above-described positioning elements for controlling a position of the second surface relative to the first surface.

Figure 3A:
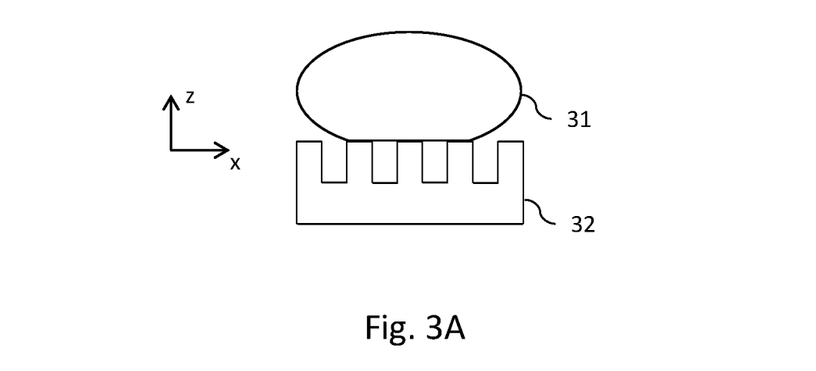
FIGS. 3A and 3B are schematic illustrations of phobic and philic regions of a surface.
Figure 3B:
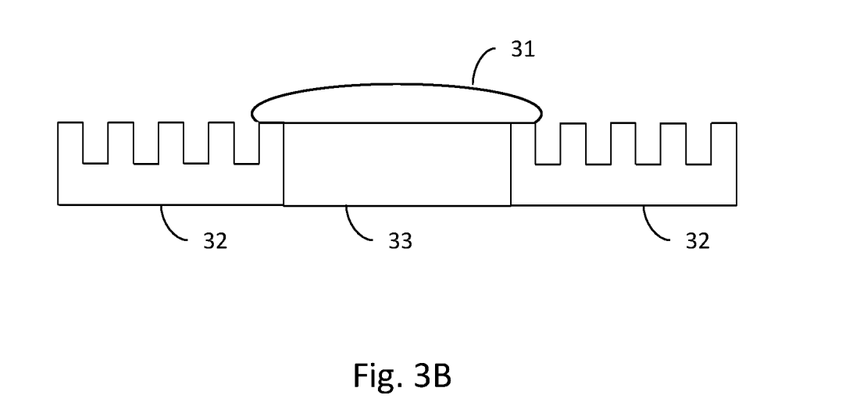

As schematically shown in FIGS. 3A and 3B, nanoimprint lithography may additionally be used to create phobic structures that repel an adhesive, and philic structures that attract an adhesive.

For a smooth surface, whether or not a liquid or gel (hereafter just "liquid" for simplicity) is attracted to the surface (a philic surface) or repelled by the surface (a phobic surface) depends on surface bonds. More specifically, if the total surface energy of the liquid, including energy at the solid-liquid interface and energy at the liquid-air interface, is decreased by spreading over the surface, then the liquid will "wet" the surface, i.e. spread over the surface. As the liquid spreads, a contact angle between the surface and liquid changes and eventually an equilibrium is reached where further spreading does not decrease the surface energy.

In this description "philic" and "phobic" are defined relative to each other. The degree to which the adhesive is attracted to a surface depends upon the contact angle which the adhesive forms when resting on the surface.

At a boundary between a surface with a higher contact angle (a relatively phobic surface) and a surface with a lower contact angle (a relatively philic surface), the adhesive is preferentially attracted to the philic surface where it has lower surface energy, and effectively repelled from the phobic surface where it has higher surface energy. Accordingly, the boundary acts as a barrier which inhibits the adhesive from moving from the philic surface onto the phobic surface.

Additionally, the higher the contact angle, the lower the surface area of contact between the surface and the adhesive, and the less strongly the adhesive is bound to the surface, making it easier for the adhesive to slide (flow) over or detach from the surface.

As described in detail in the previously mentioned document "Functional surfaces by means of nanoimprint lithography techniques" by Ariadna Fernandez Estevez, Universitat Autonoma de Barcelona, 2016, general surface roughness or a designed surface structure can have the effect of increasing the contact angle and/or decreasing the contact surface area, i.e. increasing the relative "phobic-ness" of the surface. Nanoimprint lithography can be used to produce such liquid-phobic surfaces, for example by producing a pattern of nanoscale protrusions. By designing the pattern of protrusions to be close enough that surface tension prevents the liquid from flowing into gaps between protrusions, and the protrusions to be narrow such that the proportional contact area against the protrusions is low, a "super-phobic" surface can be produced in which there are air gaps between the surface and the liquid, and a contact area between the surface and liquid is reduced.

FIG. 3A illustrates a drop of adhesive 31 resting on a phobic region 32. In this case the pattern of protrusions has the protrusion spacing equal to the protrusion width. Hence, the drop 31 which rests on three protrusions has a proportional contact area of 60% compared to a smooth surface of the same material.

On the other hand, FIG. 3B illustrates a drop of adhesive 31 resting on a philic region 33 between two phobic regions 32. In this case, the drop 31 resides on a smooth surface with 100% proportional contact area.

Accordingly, the drop 31 is in a lower energy state (more attractive state) in FIG. 3B than in FIG. 3A. Changing from the state shown in FIG. 3B to the state shown in FIG. 3A requires an increase in surface energy of the adhesive 31, and this change in energy corresponds to a repulsion effect by the phobic region and an attraction effect by the philic region.

The above described principles apply to any liquid or gel, in contact with any surface. The equilibrium contact angle between a liquid or gel and a smooth surface depends upon the chemistry of the materials involved, and the required scale of structural modifications to increase phobic-ness depends upon this equilibrium contact angle.

By modifying the relative attractiveness or repulsiveness of the surface for an adhesive, rather than physically blocking movement of the adhesive using structures such as shown in FIG. 2A, an additional advantage is provided in that the adhesive can be removed (e.g. chemically dissolved) without needing to break or remove a physical barrier, and thus the positioning element of this form does not inhibit deconstruction of the optical device to retrieve the individual waveguides, for example as part of a recycling method.

Figure 4A:
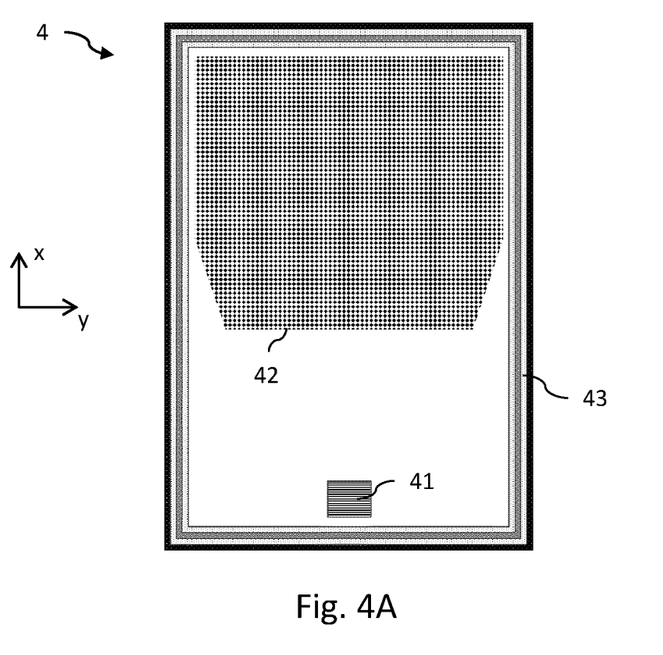
FIGS. 4A and 4B are schematic illustrations of a positioning element on a surface of a waveguide.

FIG. 4A is a schematic illustration of a surface of a waveguide 4 comprising a first optically functional region 41, a second optically functional region 42 and a positioning element 43. The waveguide 4 may be arranged to face a second waveguide, as previously described for FIG. 2

In this case, the first optically functional region 41 is an input grating, and the second optically functional region 42 is an output grating. More generally, the surface may have one or more optically functional regions of any type.

Figure 4B:
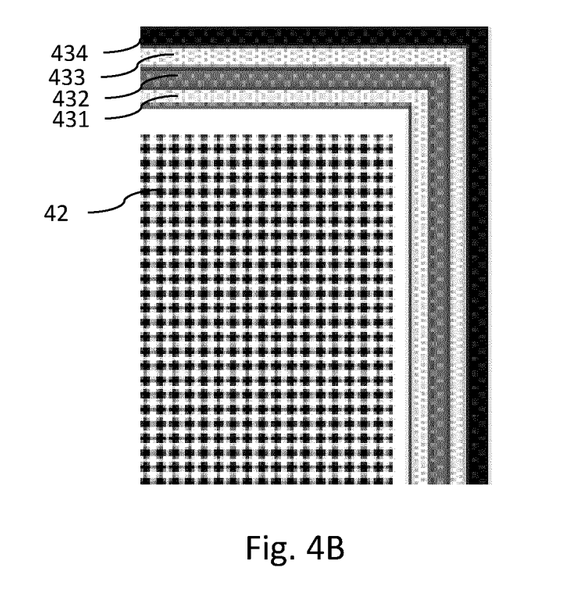

FIG. 4B shows an enlarged view of a part of the positioning element 43. In more detail, the positioning element 43 comprises a first phobic region 431, a first philic region 432, a second phobic region 433 and a second philic region 434.

The philic and phobic regions of the positioning element 43 are provided as a series of concentric portions arranged to surround the first and second optically functional regions 41, 42.

The innermost portion, the first phobic region 431, is arranged as a barrier portion surrounding the optically functional region. With this arrangement, the barrier portion divides the surface of the waveguide into a first part including an optically functional region 41, 42 and a second part. Adhesive placed in the second part, outside of the barrier portion, is inhibited by the barrier portion from moving into the first part, and is thus inhibited from moving into the optically functional region 41, 42.

Surrounding the first phobic region 431 is a first philic region 432, and surrounding the first philic region 432 is a second phobic region 433. This arrangement is similar to FIG. 3B described above. As described for FIG. 3B, an adhesive placed on the first philic region 432 is inhibited from moving out of the first philic region 432, because this would require moving onto either the first phobic region 431 or the second phobic region 433. Accordingly, the arrangement of the first phobic region 431, first philic region 432 and second phobic region 433 defines a first area of the surface of the waveguide in which an adhesive may be confined.

The waveguide shown in FIG. 4 further comprises a second philic region 434 which extends to an edge of the waveguide 4. The arrangement of the second phobic region 433 and the second philic region 434 defines a second area of the surface of the waveguide in which an adhesive may be combined. The second area of the surface of the waveguide may be used to confine a different adhesive from the first area.

For example, the second area corresponding to the second philic region 434 may be used to confine an opaque adhesive and thus prevent unwanted light from entering an optical device comprising waveguide 4, between respective ends of a pair of waveguides.

On the other hand, the first area corresponding to the first philic region 432 may be used to confine an adhesive adapted to control a spacing between waveguides, for example a spacing between first and second surfaces 23, 24, as an addition or alternative to the positioning element 27 shown previously in FIG. 2. In one embodiment, the adhesive may comprise microspheres or beads. In such an embodiment, a fluid component of the adhesive may flow to decrease a spacing between first and second surfaces, but the microspheres or beads define a minimum spacing which can be occupied by the adhesive. Alternatively, a spacing between the first surface and the second surface may be controlled by confining a known volume of adhesive using one or more philic and/or phobic regions, or by using one or more NIL protrusions as direct barriers rather than phobic barriers.

In the example shown in FIG. 4, the two optically functional regions 41, 42 are on a same surface of the waveguide 4 as the positioning element 43. However, the above-described techniques are generally useful to keep the adhesive out of a light path associated with any optically functional region, which may be on the same surface as the positioning element 43, an opposing surface of the waveguide 4, or on a different waveguide of an optical device including the waveguide 4.

The above-described specific example includes two philic regions and two phobic regions. However, in embodiments of the invention having a positioning element arranged to control a position of the adhesive, the positioning element may have any number of philic regions or phobic regions.

For example, another embodiment comprises a phobic barrier portion arranged to form a loop in which the adhesive may be placed. Accordingly, the phobic portion need not surround an optically functional region Where a philic region is provided in isolation, it should be understood that the philic region is either smoother than a surrounding surface, or is a region having a different surface material or coating with a lower contact angle than the surrounding surface.

Figure 5:
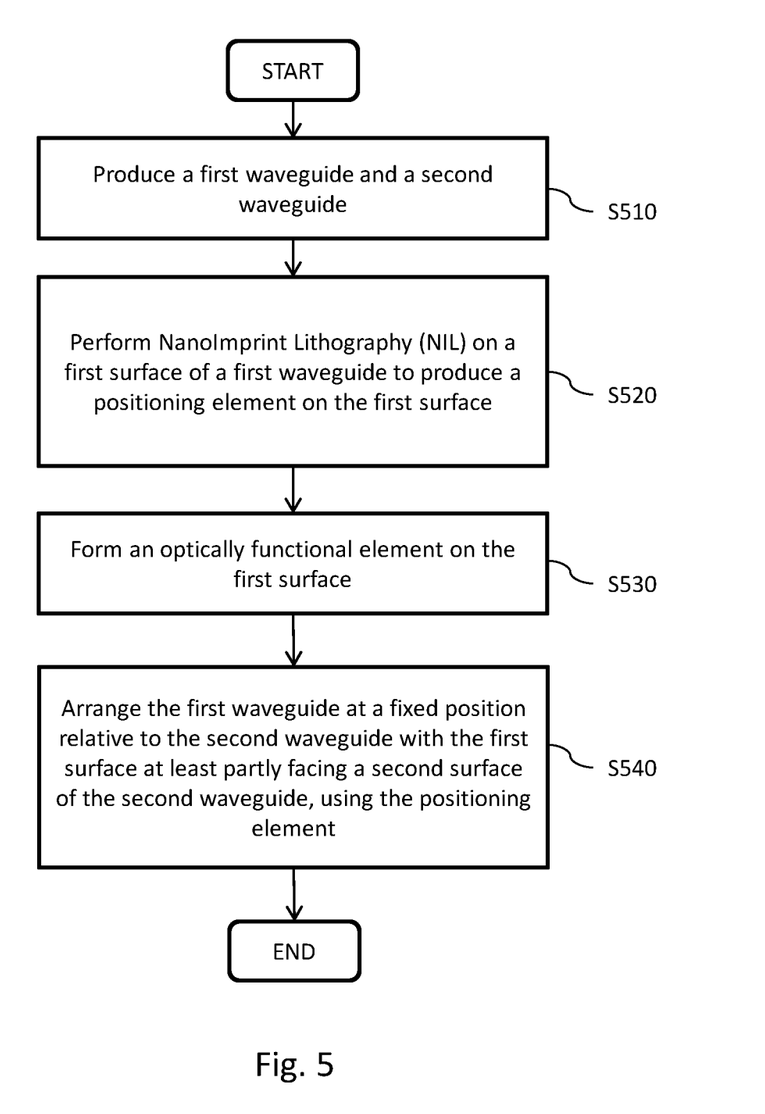
FIG. 5 is a flowchart schematically illustrating a method of manufacturing an optical device according to an embodiment.

An optical device according to the invention, such as the optical device shown in FIG. 2A, or an optical device having a waveguide 4 as shown in FIG. 4, may be manufactured as shown in FIG. 5.

Firstly, at step S510, each individual waveguide 21, 22 is produced using known techniques.

At step S520, nanoimprint lithography (NIL) is performed on one or more surfaces 23, 24 of the waveguides 21, 22, 4, using the techniques described above, to produce one or more positioning elements 27, 28, 43. This step at least comprises performing NIL on a first surface of a first waveguide to produce a positioning element on the first surface.

Then, at step S530, any optically functional regions 25, 41, 42 are formed on one or more surfaces 23, 24 of the waveguides 21, 22, 4. For example, the optically functional regions 25 shown in FIG. 2 may be etched onto the first surface 23.

Alternatively, any optically functional regions may be formed before NIL is performed, or simultaneously while NIL is performed. However, in this case it is necessary to ensure that the resist does not cover the optically functional regions when NIL is performed. Furthermore formation of optically functional regions may be omitted in the case that none are present on the surface(s) on which a positioning element is formed.

Then, at step S540, the waveguides are arranged using the one or more positioning elements. As described above, the positioning elements may control a relative position of surfaces of the waveguides, and/or may control a position of an adhesive for attaching the surfaces together. For example, referring to FIG. 2A, the first waveguide 21 is arranged at a fixed position relative to the second waveguide 22 with the first surface 23 at least partly facing the second surface 24, using the positioning elements 27 and 28.

Figure 6:
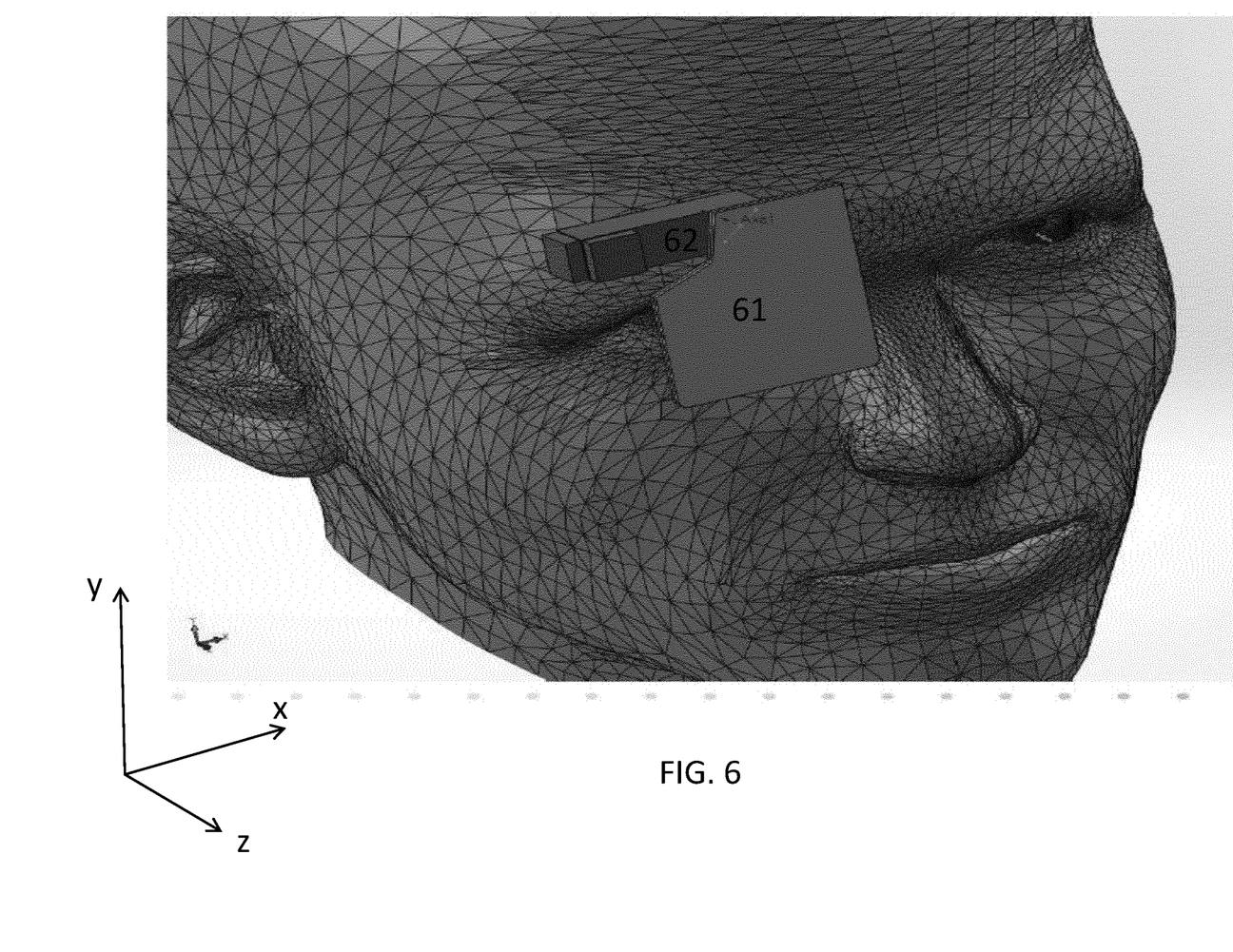
FIG. 6 is a perspective view of a user wearing a portion of an augmented reality device in an embodiment of the invention.

FIG. 6 is a perspective view of a user wearing a portion of an augmented reality headset in an embodiment of the invention. In this example an optical device 61 is provided in front of a user's eye so that they can view augmented reality images while continuing to see the physical world around them. The headset includes a projector 62 positioned to project light along the z-axis towards the optical device 61. A battery (not shown) is provided and supplies power to the projector 62. In addition, a frame (not shown) is provided for mounting the assembly on the user's head. The augmented reality headset may alternatively be a virtual reality headset, which need not allow the user to see light from their external environment.

In the above description, an optical device comprises two waveguides. However, it will be readily understood that the above-described techniques may be applied to an optical device including any number of waveguides with one or more pairs of surfaces facing each other.

The invention claimed is:

1. An optical device comprising:
a first waveguide comprising a first surface; and
a second waveguide comprising a second surface,
wherein the first waveguide is at a fixed position relative to the second waveguide with the first surface at least partly facing the second surface, and
the first surface comprises a first positioning element, wherein the first positioning element is a NanoImprint Lithography (NIL) structure,
the second surface comprises a second positioning element, wherein the second positioning element is a NanoImprint Lithography (NIL) structure,
the optical device further comprising an adhesive arranged for attaching the first surface to the second surface,
wherein the first positioning element is arranged to control a position of the adhesive, and the first positioning element comprises at least one of:
a philic region adapted to attract the adhesive by having a lower contact angle with the adhesive compared to surrounding regions; or
a phobic region adapted to repel the adhesive by having a higher contact angle with the adhesive compared to surrounding regions.

2. An optical device according to claim 1, wherein the first positioning element is arranged to control a position of the second surface relative to the first surface.

3. An optical device according to claim 2, wherein the first positioning element is arranged to control a spacing between the first surface and the second surface.

4. An optical device according to claim 1, wherein the second positioning element is adapted to engage with the first positioning element.

5. An optical device according claim 1, wherein the first surface or the second surface comprises an optically functional region, the first positioning element comprises a barrier portion arranged to surround the optically functional region, and the adhesive is arranged on the first surface outside of the barrier portion.

6. An optical device according to claim 1, wherein the adhesive is opaque.

7. An optical device according to claim 1, wherein the adhesive is adapted to control a spacing between the first surface and the second surface.

8. An optical device according to claim 7, wherein the adhesive comprises microspheres or beads.

9. A method for manufacturing an optical device comprising a first waveguide and a second waveguide wherein the first waveguide is at a fixed position relative to the second waveguide, the method comprising:
performing NanoImprint Lithography on a first surface of the first waveguide to produce a first positioning element on the first surface;
performing NanoImprint Lithography on a second surface of the second waveguide to produce a second positioning element on the second surface;
arranging the first waveguide at a fixed position relative to the second waveguide with the first surface at least partly facing the second surface, using the first positioning element; and
providing an adhesive for attaching the first surface to the second surface,
wherein the first positioning element is arranged to control a position of the adhesive, and the first positioning element comprises at least one of:
a philic region adapted to attract the adhesive by having a lower contact angle with the adhesive compared to surrounding regions; or
a phobic region adapted to repel the adhesive by having a higher contact angle with the adhesive compared to surrounding regions.

10. The method of claim 9 further comprising arranging the first positioning element to control a position of the second surface relative to the first surface.

11. The method of claim 10, wherein arranging the first positioning element comprises controlling a spacing between the first surface and the second surface.

12. The method of claim 9 further comprising controlling a spacing between the first surface and the second surface through the adhesive.

13. An optical device comprising:
- a first waveguide including a first surface having a first positioning element including a NanoImprint Lithography (NIL) structure having at least one of a philic region adapted to attract an adhesive by having a lower contact angle with the adhesive compared to surrounding regions or a phobic region adapted to repel the adhesive by having a higher contact angle with the adhesive compared to surrounding regions;
- a second waveguide at a fixed position relative to the second waveguide, the second waveguide including a second surface at least partly facing the first surface, the second surface comprising a second positioning element that is a NanoImprint Lithography (NIL) structure; and
  - the adhesive, arranged for attaching the first surface to the second surface, the first positioning element being arranged to control a position of the adhesive and the philic region or phobic region of the first positioning element.

14. The optical device of claim 13, wherein the first positioning element controls a position of the second surface relative to the first surface.

15. The optical device of claim 14, wherein the first positioning element controls a spacing between the first surface and the second surface.

16. The optical device of claim 13, wherein the second positioning element engages with the first positioning element.

17. The optical device of claim 13, wherein the first surface or the second surface comprises an optically functional region, the first positioning element comprises a barrier portion arranged to surround the optically functional region, and the adhesive is on the first surface outside of the barrier portion.

18. The optical device of claim 13, wherein the adhesive has a thickness to control a spacing between the first surface and the second surface.

19. The optical device of claim 13, wherein the adhesive is adapted to control a spacing between the first surface and the second surface.

20. The optical device of claim 19, wherein the adhesive comprises microspheres or beads.

* * * * *